March 9, 1943. R. S. BOHANNAN 2,313,509
WEIGHING SCALE
Filed Oct. 17, 1939 4 Sheets-Sheet 1
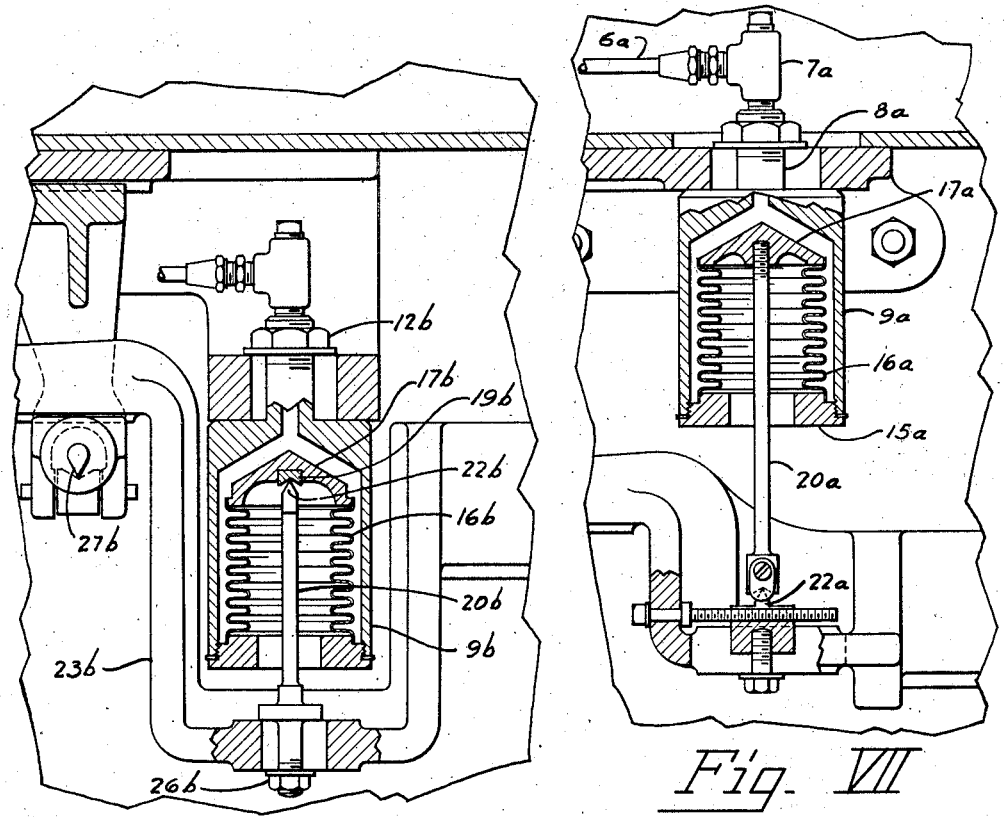
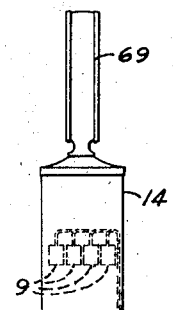
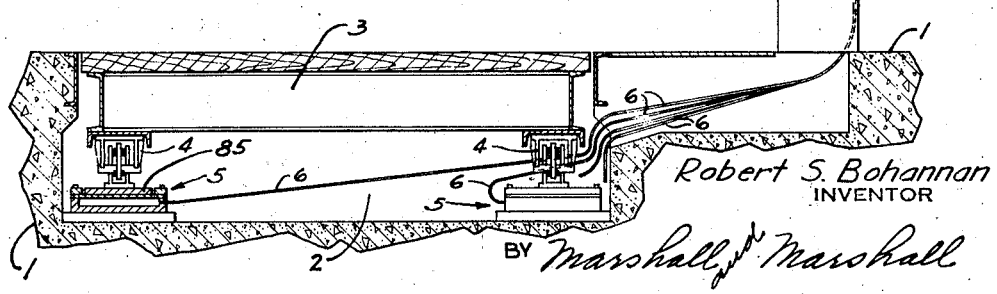
Robert S. Bohannan
INVENTOR
BY Marshall & Marshall
ATTORNEYS

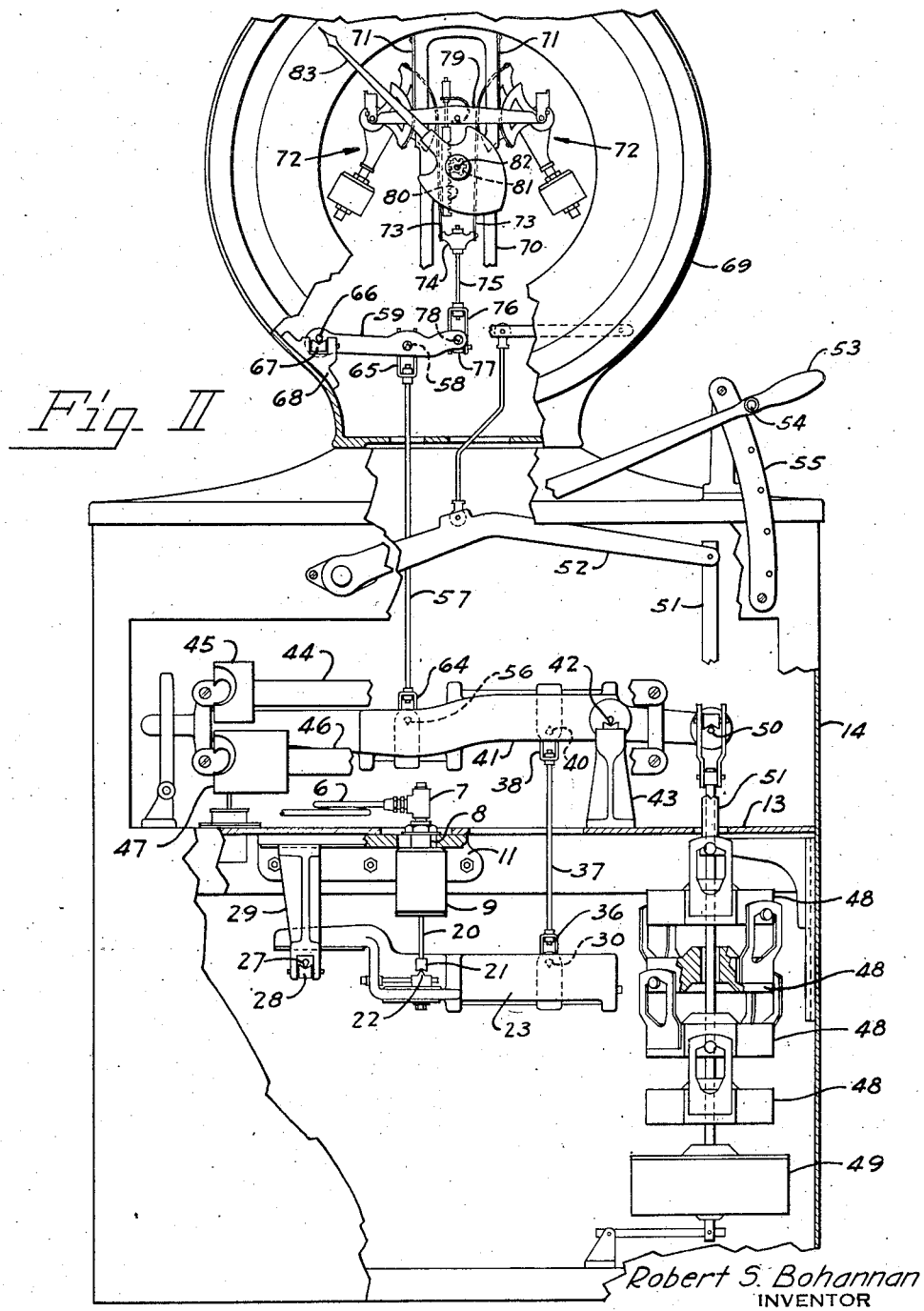

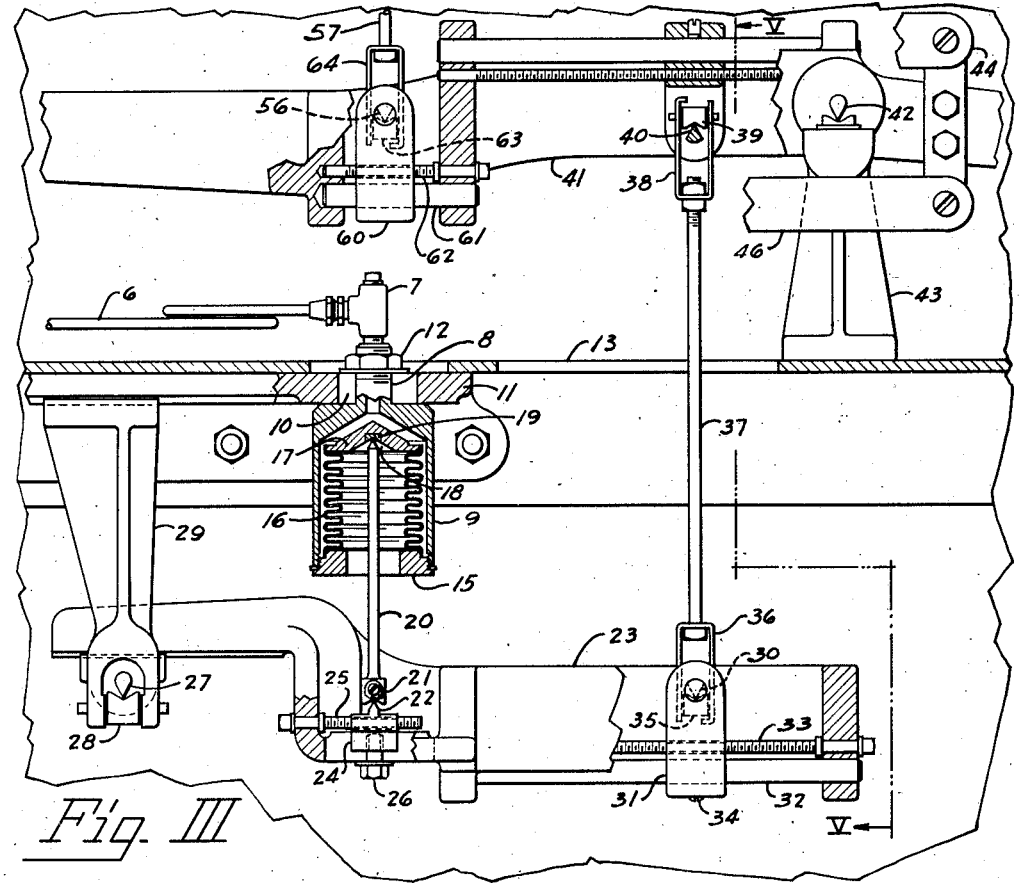
Fig. III
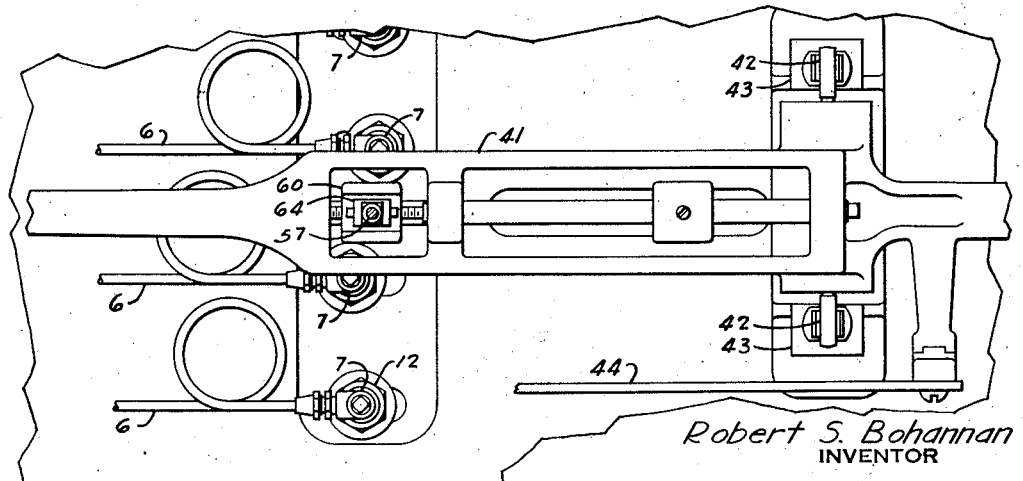
Fig. IV

March 9, 1943.    R. S. BOHANNAN    2,313,509
WEIGHING SCALE
Filed Oct. 17, 1939    4 Sheets-Sheet 4
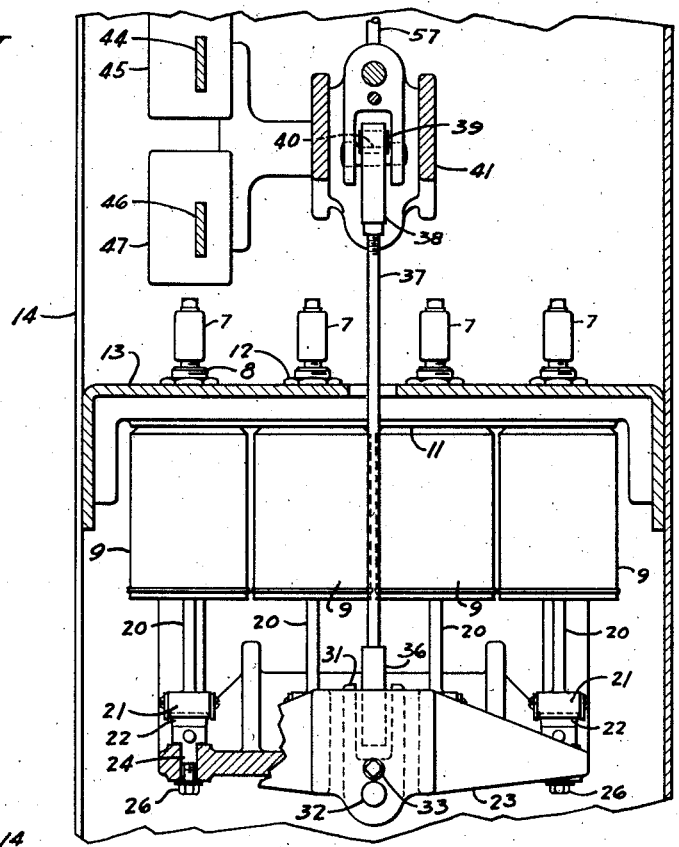
Fig. V
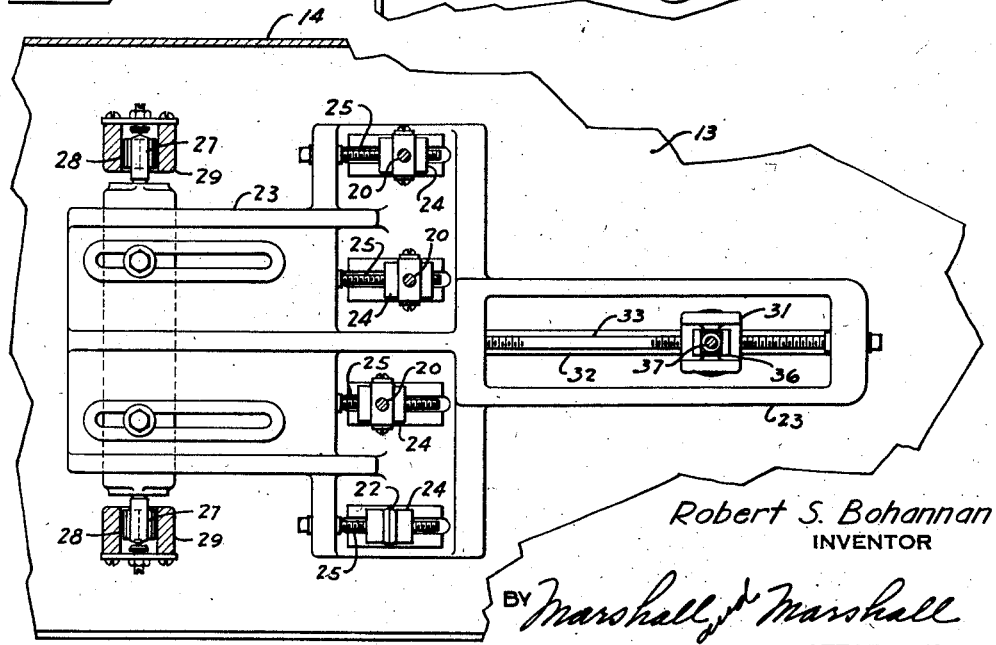
Fig. VI
Robert S. Bohannan
INVENTOR
BY Marshall & Marshall
ATTORNEYS Patented Mar. 9, 1943

2,313,509

UNITED STATES PATENT OFFICE 2,313,509

WEIGHING SCALE

Robert S. Bohannan, Toledo, Ohio, assignor to Toledo Scale Company, Toledo, Ohio, a corporation of New Jersey Application October 17, 1939, Serial No. 299,832

8 Claims. (Cl. 265—47)

This invention relates to weighing scales, and particularly to weighing scales of the type in which forces exerted by loads on load receivers are transmitted hydraulically to metallic bellows, and thence through linkage and leverage to load counterbalancing mechanism.

It is an object of this invention to improve the manner of application of hydraulic force to such bellows.

Another object of the invention is to improve the means whereby the hydraulic force applied to the bellows is transmitted to leverage connected to load counterbalancing mechanism.

Another object is to provide an improved means of adjustment to compensate for differences in area of surfaces to which hydraulic pressures are applied.

Another object is to provide an improved combination of hydraulic transmission and automatic load counterbalancing mechanism.

Another object is to provide improved means of applying hydraulically transmitted force to a pivot edge on a lever.

Other objects and advantages will be apparent from the following description, in which reference is had to the accompanying drawings illustrating preferred embodiments of my invention and wherein similar reference numerals designate similar parts throughout the several views.

In the drawings:

Fig. I is a side elevational view, with parts broken away and parts shown in section, of a weighing scale embodying the invention.

Fig. II is an enlarged front elevational view of the head of such weighing scale, parts being broken away and parts being shown in section.

Fig. III is a further enlarged fragmentary front elevational view, with parts in section, showing one form of bellows and force transmitting linkage and leverage employed in my invention.

Fig. IV is a similarly enlarged fragmentary plan view showing substantially the same parts as are illustrated in Fig. III.

Fig. V is a fragmentary side elevational view in section substantially as indicated by the line V—V of Fig. III.

Fig. VI is a plan view showing a shelf lever to which force is transmitted from the bellows, the fulcrum bearings of the lever and force transmitting links being shown in section.

Fig. VII is a still further enlarged fragmentary front elevational view, with parts in section, showing a modification; and Fig. VIII is a similarly enlarged fragmentary front elevational view, with parts in section, showing another modification.

The scale illustrated in the drawings is of the auto truck type supported on a concrete foundation 1 having a pit 2 which contains the weighbridge 3. The weighbridge is supported through links 4 upon capsules 5.

Connected to each of the capsules 5 is one end of a tube 6, the other end of which is connected through a suitable fitting 7 to a nipple 8 formed upon the upper end of a cylindrical chamber 9. The nipples 8 extend upwardly through slots 10 in a bracket 11, and nuts 12 are threaded upon the nipples 8 and serve to clamp the cylindrical chambers 9 to the bracket 11, the bracket 11 being in turn secured beneath a shelf 13 which is mounted within a cabinet 14 that is supported upon the concrete foundation 1.

Secured within the lower end of each cylindrical chamber 9 by means of a threaded and liquid-tight joint is an annulus 15 to the upper face of which is brazed or otherwise non-leakably connected the lower edge of a metallic bellows 16, the open end of the bellows being thus sealed to the open end of the chamber. Brazed or otherwise non-leakably secured to the upper edge of the metallic bellows 16 is a disk 17 having a downwardly-opening socket 18 within which is fixed a hard bearing 19 preferably having a conical seat in its lower side. Seated in the conical seat of the bearing 19 is the pointed upper end of a push rod 20 having a bearing 21 at its lower end which is seated upon a knife edge pivot 22.

It is to be understood that each of the cylindrical chambers 9 is provided with a metallic bellows 17 that acts upon a push rod 20, the lower end of which is provided with a bearing which is seated upon a knife edge pivot 22.

All of the pivots 22 are mounted upon a shelf lever 23, each pivot 22 being fixed in a retainer 24 which may be adjusted longitudinally of the lever 23 by means of an adjusting screw 25. Each retainer 24 is provided with a locking screw 26 to fasten it in adjusted position.

Fulcrum pivots 27 are secured to the shelf lever 23 and rest upon V-groove bearings 28 which are supported by a bracket 29 depending from the shelf 13.

The shelf lever 23 is provided with a single nose pivot 30 mounted in a pivot retainer 31 which is slidably mounted on a bar 32 that is secured to and extends longitudinally of the shelf lever 23. The pivot retainer 31 may be adjusted along the bar 32 by means of an adjusting screw 33 and may be clamped in adjusted position by means of a setscrew 34.

Engaging the nose pivot 30 is a bearing 35 that is carried by a stirrup 36 connected to the lower end of a pull rod 37, another stirrup 38 being connected to the upper end of the pull rod and carrying another bearing 39 that engages a load pivot 40 of a tare beam lever 41. The mounting of the pivot 40 on the tare beam lever 41 is identical with the mounting of the pivot 30 on the shelf lever 23, and the pivots are adjusted similarly to keep the pull rod 37 vertical when the lever multiplication is changed. As will be seen by reference to Figs. II and III, the tare beam lever 41 is supported, by means of fulcrum pivots 42, upon a fulcrum stand 43 which is supported upon the shelf 13.

The tare beam lever 41 carries a tare beam 44 and tare poise 45 and also carries a capacity beam 46 and capacity poise 47, and in order to provide still greater capacity, a series of drop weights 48 may be dropped upon a pan 49 suspended from a drop weight pivot 50 that is fixed in one end of the tare beam lever 41. The pan 49 also serves as a loading box to contain lead or other heavy metal for properly counterbalancing the mass of the tare beam lever 41 and the parts connected thereto.

The drop weights 48 may be lowered upon the pan 49 by means of a link 51 suspended from an arm 52 to which an operating handle 53 is rigidly connected, the handle 53 having a thumb latch 54 which cooperates with openings in an arcuate bar 55 to hold the handle 53 in any position in which it may be set.

The tare beam lever 41 is connected through a nose pivot 56 and a tension rod 57 to the load pivot 58 of a pendulum lever 59. The nose pivot 56 is mounted in a pivot retainer 60 which is slidable upon a bar 61 and adjustable thereon by means of an adjusting screw 62, and the pivot 56 engages a bearing 63 carried by a stirrup 64 at the lower end of the tension rod 57, the upper end of the tension rod having another stirrup 65 which carries another bearing (not shown) that engages the pivot 58 of the pendulum lever 59.

The fulcrum pivot 66 of the pendulum lever 59 is supported by a bearing 67 mounted in a bracket 68 within a dial housing 69 which surmounts the cabinet 14. Supported within the dial housing 69 is a sector guide 70 upon which are supported, by means of flexible metallic ribbons 71, a pair of load counterbalancing pendulums 72.

The pendulums 72 are connected by means of flexible metallic ribbons 73 to a crosshead 74 secured to the upper end of a link 75, the lower end of which is secured to a stirrup 76 that carries a bearing 77 which engages the nose pivot 78 of the pendulum lever 59. Connected to the pendulums 72, to be moved vertically as the pendulums swing, is a compensating frame 79 which carries a rack 80 that meshes with a pinion 81 fixed upon a shaft 82 to which the indicating hand 83 also is fixed.

When a load is moved onto the weighbridge 3, the weight of the load is transmitted to diaphragms 85 in the capsules 5, and pressure is thus applied to liquid contained within the capsules 5, the tubes 6 and the cylindrical chambers 9. Pressure in the chambers 9 presses the disks 17 downwardly upon the push rods 20 to swing the shelf lever 23 and to pull downwardly on the pull rod 37.

The downward pull is transmitted through the tare beam lever 41, the tension rod 57, the pendulum lever 59, the link 75 and the ribbons 73 to the pendulums 72, which swing outwardly and upwardly to positions in which the load is counterbalanced. As the pendulums swing, the indicator 83 is turned into proper indicating position.

If the load on the weighbridge 3 be greater than the automatic counterbalancing capacity of the pendulums, the load may be partially offset by depositing one or more of the drop weights 48 upon the pan 49. The poises 45 and 47 may also be moved into positions on the beams 44 and 46 where they partially counterbalance loads. The tare beam lever, drop weight mechanism and the automatic load counterbalancing and indicating mechanisms are well known and are illustrated and described herein to show the cooperative relation thereto of the novel force transmitting mechanism of this invention.

Each capsule 5 with the tube 6 and cylindrical chamber 9 connected thereto is a closed system at one end of which is the diaphragm 85 in the capsule 5, the disk 17 secured to the bellows 16 being at the other end of the closed system. Since the pressure of the liquid is exerted upon the exterior of the bellows 16, the bellows is capable of withstanding much greater pressure than it would be capable of withstanding if the pressure were exerted upon the interior of the bellows as is the case in the device illustrated and described in my copending application Ser. No. 222,831.

Where fluid pressure is exerted upon the interior of a bellows the bellows tends to elongate, and where such elongation is resisted by abutments against the ends the bellows is liable to buckle under extreme internal fluid pressures, since the volumetric content of the bellows is permitted to increase by buckling. In the arrangement illustrated and described in this application any buckling of the metallic bellows 16 decreases the volumetric content of the chamber 9, i. e., buckling of the bellows 16 tends to force liquid out of the chamber 9. Hence, forcing liquid into the chamber cannot cause the bellows to buckle.

Since each capsule 5 with its connected tube 6 and chamber 9 is a separate hydraulic system, the effect of a load on any corner of the weighbridge 3 may be varied by varying the point of application of the force applied through the hydraulic system supporting that corner of the weighbridge to the shelf lever 23. The point of application of the load to the shelf lever 23 may be varied by adjusting the position of the pivot 22. If the diaphragms 85 in the capsules 5 were all of exactly the same area and if the effective areas of the disks 17 were exactly alike, the knife edges of the pivots 26 would have to be aligned if the scale were to weigh correctly regardless of where the load was moved upon the weighbridge. If, however, a diaphragm in one of the capsules 5 were slightly oversize so that the hydraulic pressure per unit of area in the system of which that diaphragm forms a part were slightly less for a given load, a slight adjustment of the pivot 22 connected to that hydraulic system would compensate for the excess area of the diaphragm.

Oversize of a diaphragm in a capsule 5 is compensated for by moving the connected pivot away from the fulcrum of the shelf lever while oversize of a bellows disk 17 is compensated for by moving the connected pivot toward the shelf lever fulcrum, and vice versa.

In order to restore proper angular relation of each of the push rods 20 after adjustment of the pivot receiving its thrust, the nut 12 is loosened and the chamber 9 is moved in the same direction as that in which the pivot 22 was moved and to approximately the same extent.

The force exerted upon the disk 17 is applied to the shelf lever 23 at a definite distance from the fulcrum pivots, and since the bearing 19 in the disk 17 is above the major portion of the upper disk surface, it is unnecessary to check the rod 20.

In the modification illustrated in Fig. VII, the tube 6a, fitting 7a, nipple 8a and chamber 9a, as well as the annulus 15a and bellows 16a, may be identical with the corresponding parts of the form illustrated in Fig. III. The disk 17a, however, is rigidly connected to the upper end of the push rod 20a. Hence, the slight rocking action of the push rod resulting from the arcuate movement of the pivot 22a will result in a slight flexing of the bellows 16a.

In the modification illustrated in Fig. VIII, the push rod is in the form of a strut 20b rigidly but adjustably secured to the lever 23b. The upper end of the strut 20b is chisel-shaped to form a knife edge pivot 22b, and the knife edge of the pivot 22b lies nearly in the horizontal plane passing through the knife edge of the fulcrum pivots. Hence, the horizontal component of movement of the pivot 22b is reduced to the minimum. Such horizontal movement as occurs is permitted by slight flexing of the bellows 16b.

Adjustment of the lower end of the strut 20b along a slot in the lever 23b is permitted when the locking nut 26b is loosened. Such adjustment changes the distance between the fulcrum pivot 21b and the load pivot 22b.

In order to prevent binding, the position of the chamber 9b should be adjusted to preserve the relation of the chamber and bellows to the knife edge pivot 22b. If the nut 12b is loosened and the chamber pulled downwardly while the disk 17b and bearing 19b are hydraulically pressed against the pivot 22b, the chamber when released will tend to assume its proper position.

It will be observed that in all the modifications illustrated the hydraulic force is so applied to the bellows and so resisted that there is no tendency of the bellows to buckle. It will be observed further that the bellows and push rod assemblies in all the modifications are stable under pressure and resistance, that is, that neither the bellows nor the thrust members tend to tip out of place when the hydraulic pressure applied to the bellows is resisted by the thrust members. These are very important advantages of the invention. In prior constructions the bellows had to be stiff enough and the abutments against which the bellows expanded had to be broad enough to prevent buckling and tipping out of position, but in all the forms of this invention the forces are so applied and resisted as to hold the axes of the bellows straight and in proper position.

It will be observed also that in all the modifications, force is transmitted from each bellows to a knife edge on a lever, the knife edge and the bellows mounting both being adjustable to compensate for variations in area of the movable surfaces that are under hydraulic pressure, and that the fact that both the knife edge and the bellows mounting are adjustable in the same direction and to the same extent enables the compensation to be effected without changing the angularity of the member transmitting force from the bellows to the pivot.

The embodiments of my invention herein shown and described are to be regarded as illustrative only, and it is to be understood that the invention is susceptible to variation, modification and change within the spirit and scope of the subjoined claims.

Having described my invention, I claim:

1. In a weighing scale, in combination, a weighbridge, a plurality of capsules supporting said weighbridge, a chamber corresponding to each of said capsules, a conduit connecting each of said capsules to its corresponding chamber, said capsules, conduits and chambers containing liquid to which pressure is applied by loads on said weighbridge, a metallic bellows contained in each of said chambers, said bellows being surrounded by such liquid, there being an opening from the exterior of each of said chambers to the interior of the bellows contained therein, a frame supporting said chambers, a lever supported by said frame and having an independently adjustable load pivot corresponding to each of said chambers, said chambers being each independently adjustable on said frame to adjust its relation to its corresponding load pivot, and thrust members acting through said openings to transmit force from said bellows to said load pivots.

2. In a weighing scale, in combination, a weighbridge, a plurality of capsules supporting said weighbridge, a chamber corresponding to each of said capsules, a conduit connecting each of said capsules to its corresponding chamber, said capsules, conduits and chambers containing liquid to which pressure is applied by loads on said weighbridge, a metallic bellows contained in each of said chambers, said bellows being surrounded by such liquid, there being an opening from the exterior of each of said chambers to the interior of the bellows contained therein, a frame supporting said chambers, a lever supported by said frame and having an independently adjustable load pivot corresponding to each of said chambers, said chambers being each independently adjustable on said frame to adjust its relation to its corresponding load pivot, thrust members acting through said openings to transmit force from said bellows to said load pivots, load counterbalancing mechanism, and means operatively connecting said lever to said load counterbalancing means.

3. In a weighing scale, in combination, a commodity receiver, a plurality of capsules supporting said commodity receiver, a chamber corresponding to each of said capsules, a conduit connecting each of said capsules to its corresponding chamber, said capsules, conduits and chambers containing liquid to which pressure is applied by loads on said commodity receiver, a metallic bellows contained in each of said chambers and surrounded by such liquid, there being an opening from the exterior of each of said chambers to the interior of the bellows contained therein, a plurality of thrust members acting through said openings, each of said thrust members being individually connected at one end to a different one of said bellows, a lever, means pivotally supporting said lever and constraining it to swing about an axis extending substantially perpendicularly to the directions of extension of said thrust members, the other ends of said thrust members being connected to said lever at points definitely located thereon, means for preventing such points of location from shifting on said lever, whereby that end of each of said thrust members that is connected to said lever is constrained to movement in a definite path, and load counterbalancing mechanism to which said bellows are operatively connected through said thrust members and said lever.

4. In a weighing scale, in combination, a commodity receiver, a plurality of capsules supporting said commodity receiver, a chamber corresponding to each of said capsules, a conduit connecting each of said capsules to its corresponding chamber, said capsules, conduits and chambers containing liquid to which pressure is applied by loads on said commodity receiver, a metallic bellows contained in each of said chambers and surrounded by such liquid, there being an opening from the exterior of each of said chambers to the interior of the bellows contained therein, a plurality of thrust members acting through said openings, each of said thrust members being individually connected at one end to a different one of said bellows, a lever, means pivotally supporting said lever and constraining it to swing about an axis extending substantially perpendicularly to the directions of extension of said thrust members, the other ends of said thrust members being connected to said lever at points definitely located thereon, means for preventing such points of location from shifting on said lever, whereby that end of each of said thrust members that is connected to said lever is constrained to movement in a definite path, the last named means being manually adjustable to independently adjust such points of location longitudinally of said lever, and load counterbalancing mechanism to which said bellows are operatively connected through said thrust members and said lever.

5. In a device of the class described, in combination, a frame, a plurality of chambers mounted upon said frame, each of said chambers containing a bellows, there being an opening from the exterior of each of said chambers to the interior of the bellows contained therein, said chambers containing liquid surrounding said bellows and adapted to be subjected to pressure, a plurality of thrust members acting through said openings, each of said thrust members being individually connected at one end to a different one of said bellows, a lever, means pivotally supporting said lever and constraining it to swing about an axis extending substantially perpendicularly to the directions of extension of said thrust members, the other ends of said thrust members being connected to said lever at points definitely located thereon and means for preventing such points of location from shifting on said lever, whereby that end of each of said thrust members that is connected to said lever is constrained to movement in a definite path.

6. In a device of the class described, in combination, a frame, a plurality of chambers mounted upon said frame, each of said chambers containing a bellows, there being an opening from the exterior of each of said chambers to the interior of the bellows contained therein, said chambers containing liquid surrounding said bellows and adapted to be subjected to pressure, a plurality of thrust members acting through said openings, each of said thrust members being individually connected at one end to a different one of said bellows, a lever, means pivotally supporting said lever and constraining it to swing about an axis extending substantially perpendicularly to the directions of extension of said thrust members, the other ends of said thrust members being connected to said lever at points definitely located thereon, means for preventing such points of location from shifting on said lever, whereby that end of each of said thrust members that is connected to said lever is constrained to movement in a definite path, the last named means being manually adjustable to independently adjust such points of location longitudinally of said lever, and load counterbalancing mechanism to which said bellows are operatively connected through said thrust members and said lever.

7. In a weighing scale, in combination, a frame, a plurality of bellows supported thereby, means for exerting varying pressures on said bellows, a lever supported by said frame, means pivotally connecting each of said bellows to said lever for transmitting to said lever varying forces set up by such varying pressures, said connecting means being severally adjustable along said lever and said bellows also being severally adjustable along said frame in the directions of adjustment of said pivotal connections.

8. In a device of the class described, in combination, a frame, a plurality of bellows mounted on said frame, a lever, means whereby hydraulic pressure forces acting upon said bellows result in thrusts against said lever, means for independently adjusting the locations of the thrusts resulting from pressures to which the several bellows are subjected, and means for correspondingly adjusting the positions in which said bellows are mounted upon said frame.

ROBERT S. BOHANNAN.